Feb. 8, 1944. G. R. WOOD 2,341,256
FOOD HANDLING APPARATUS
Filed Aug. 18, 1942 3 Sheets-Sheet 1
FIG. I
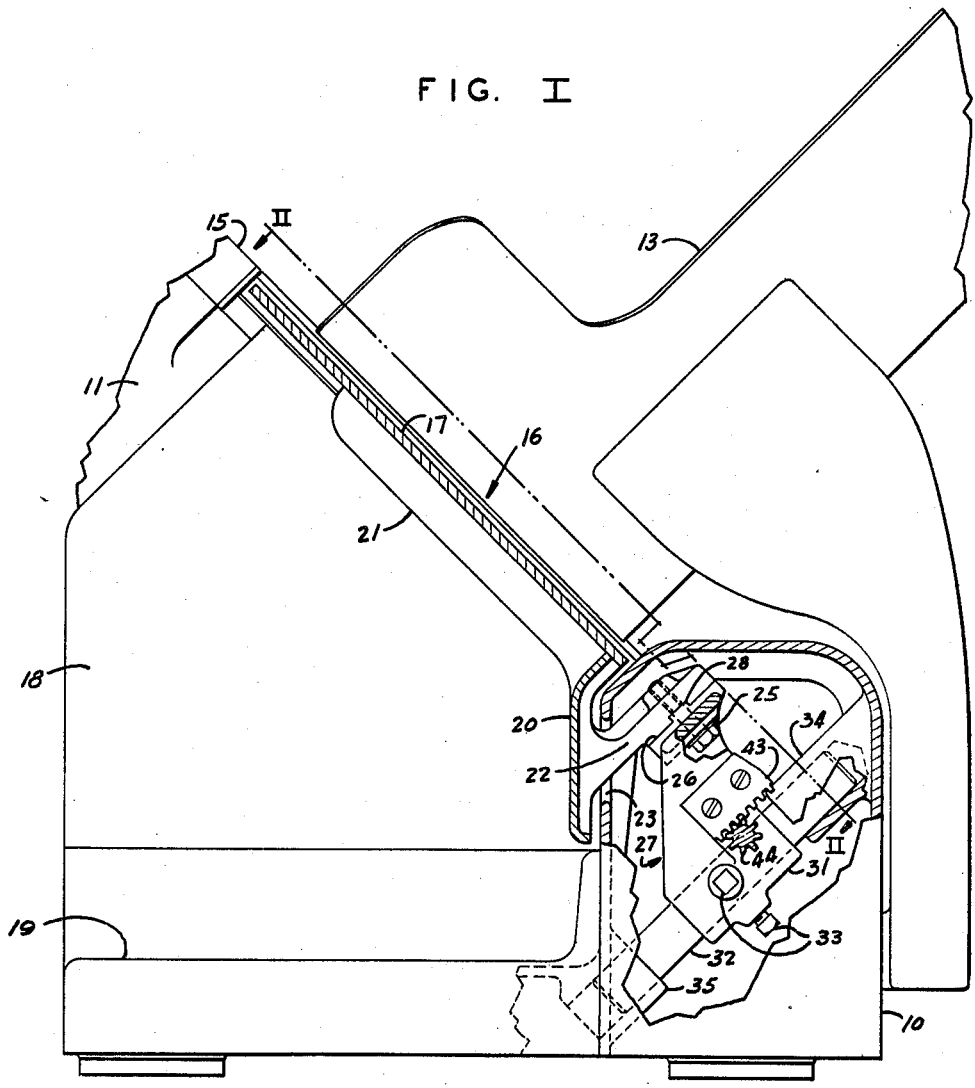
INVENTOR.
GEORGE R. WOOD
ATTORNEY

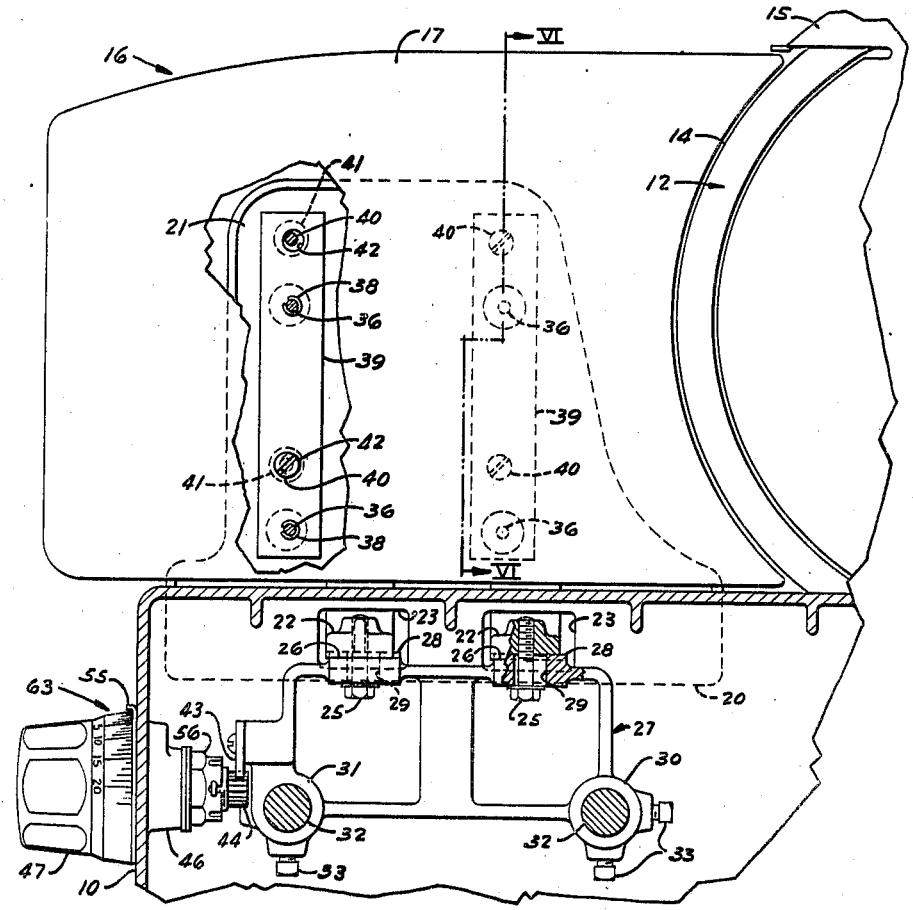
FIG. II
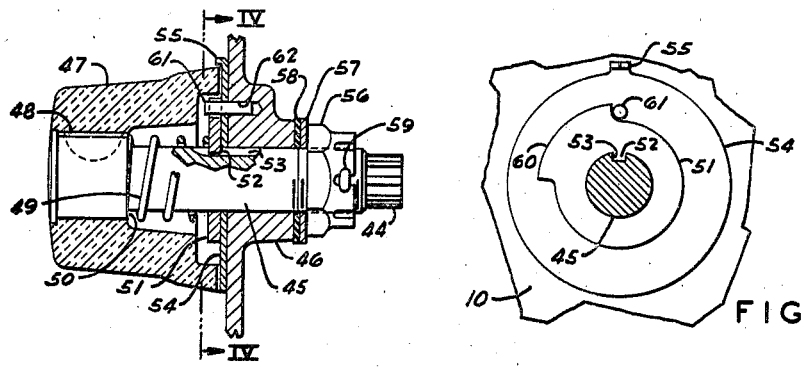
FIG. III  FIG. IV
INVENTOR.
GEORGE R. WOOD

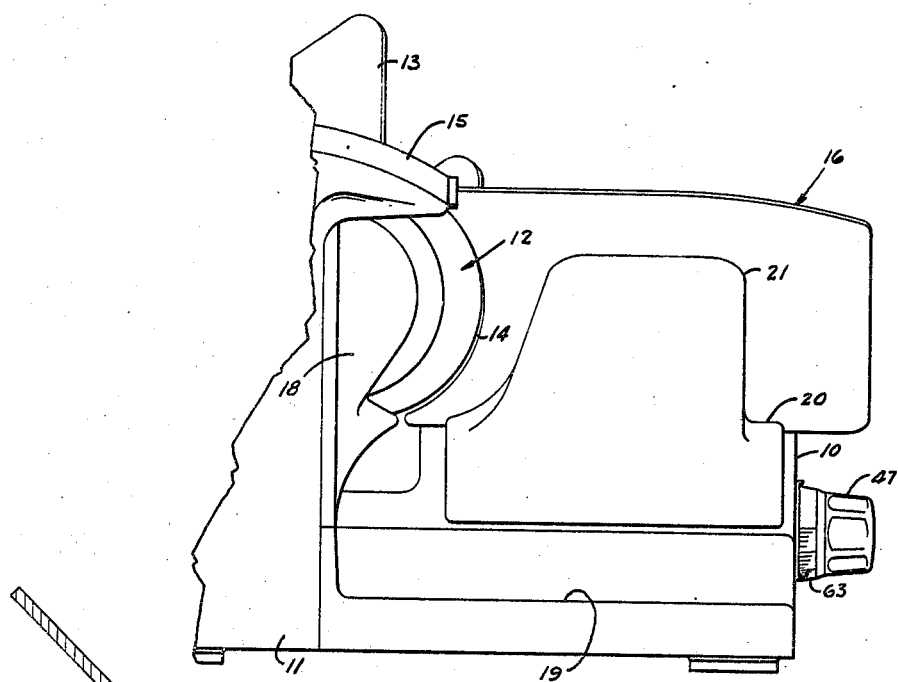
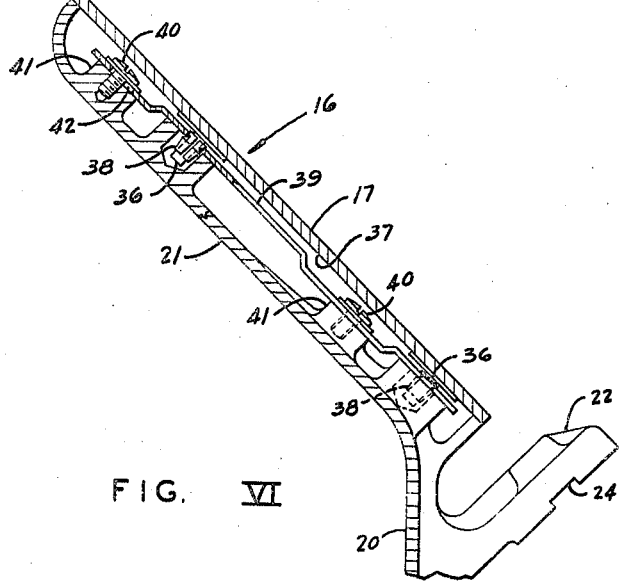
FIG. V
FIG. VI
INVENTOR.
GEORGE R. WOOD
ATTORNEY

Patented Feb. 8, 1944

2,341,256

UNITED STATES PATENT OFFICE 2,341,256

FOOD HANDLING APPARATUS

George R. Wood, Montreal, Quebec, Canada, assignor to Toledo Scale Company, Toledo, Ohio, a corporation of New Jersey Application August 18, 1942, Serial No. 455,234

2 Claims. (Cl. 146—102)

This invention relates to food handling apparatus of the type in which a commodity to be sliced is carried in a commodity tray past an exposed edge of a circular rotary knife, a slice of commodity being severed during each stroke, and it relates more particularly to means for gauging the thickness of slices to be severed.

In slicing machines of the type described a gauge plate is usually mounted on the base of the machine with one of its edges closely adjacent the exposed cutting edge of the rotary circular knife and with its face in a plane substantially parallel to the plane of rotation of the knife. A gauge plate so mounted is usually adjustable up to, and away from, the plane of rotation of the knife to vary the thickness of slices severed from a commodity moved along its face and past the cutting edge of the knife.

A gauge plate of this type must easily be adjustable to vary the thickness of slices to be severed, must be mounted in such a way that it can be moved longitudinally toward the hub of the rotary circular knife, as the diameter of the knife is decreased by sharpening, to keep the edge of the gauge plate closely adjacent the edge of the knife, and must be mounted so as to afford as few dirt and grease catching projections and crevices as possible.

It is an object of this invention to provide a gauge plate mounting which will firmly hold a gauge plate substantially parallel to the plane of rotation of a slicing machine knife without any exposed fastenings, screw heads, nuts or bolts.

It is another object of this invention to provide means for adjusting the position of a gauge plate to vary the thickness of slices severed by a rotary circular knife which is positive and easy to operate.

It is a further object of this invention to provide means for mounting a gauge plate with one of its edges closely adjacent the cutting edge of a rotary circular knife, such mounting being adjustable to permit the gauge plate to be moved to compensate for a decrease in diameter of the rotary circular knife due to sharpening.

More specific objects and advantages are apparent from the description, in which reference is had to the accompanying drawings illustrating a preferred form of slicing machine embodying the invention.

In the drawings:

Fig. I is a view, partly in section and partly in elevation, of a slicing machine incorporating a gauge plate and gauge plate mounting means embodying the invention.

Fig. II is a fragmentary view, taken substantially from the position indicated by the line II—II in Fig. I.

Fig. III is a fragmentary enlarged vertical sectional view of a portion of the mechanism illustrated in Fig. II.

Fig. IV is a fragmentary detailed view, taken substantially on the line IV—IV in Fig. III.

Fig. V is a fragmentary view, in elevation, taken from the left side of Fig. I and shown on a smaller scale.

Fig. VI is a vertical sectional view, taken substantially on the line VI—VI in Fig. II.

These specific drawings and the specific description that follows merely disclose and illustrate the invention and are not intended to impose limitations upon the claims.

A slicing machine embodying the invention comprises a base 10 upon which is erected a drive housing 11 enclosing means (not shown) for mounting and driving a rotary circular knife 12. A commodity tray 13 is mounted (by means not shown) for reciprocation past a forward exposed portion 14 (Figs. II and V) of the knife 12 to carry a commodity past the knife edge so that a slice is severed therefrom. The knife 12 is guarded by means of a knife guard 15 which is mounted on the drive housing 11. A gauge plate 16 is mounted above the base 10 with its forward face 17 lying in a plane parallel to the plane of the cutting edge 14 of the knife 12. When a commodity is supported by the tray 13, it is forced (by gravity in the embodiment of the invention shown) against the face 17 of the gauge plate 16, and is slid therealong past the edge of the knife 12. A slice of commodity severed by the knife 12 is deflected by a deflector plate 18 (Figs. I and V) onto a slice-receiver 19.

The gauge plate 16 is mounted above the base 10, with its face 17 parallel to the plane of the cutting edge 14 of the knife 12, by means of a gauge plate bracket 20 which has a hollow plate-like section 21 located at the rear of the gauge plate 16. The gauge plate bracket 20 has two arms 22 which extend through elongated apertures 23 in the side of the base 10 above the slice-receiver 19 and have machined channels 24 in their undersurface. The arms 22 are mounted by means of two bolts 25 upon two machined surfaces 26 on the upper side of a gauge plate frame 27 located within the base 10. A pair of tenons 28, formed on the machined surfaces 26, are engaged in the machined channels 24 of the arms 22. The channels and tenons extend substantially horizontally at right angles to the direction of thickness adjustment of the gauge plate 16 and in the direction in which the gauge plate 16 must be moved to compensate for reduction in the diameter of the knife 12 due to sharpening. The bolts 25 extend through elongated holes 29 in the frame 27 and are threaded into the arms 22 of the gauge plate bracket 20. The holes 29 are elongated in the direction in which the gauge plate is adjusted to compensate for reduction in size of the knife 12.

The gauge plate frame 27 is an open framework substantially "8"-shaped and having two sleeves 30 and 31 located at its lower corners. A pair of rods 32 are secured in the sleeves 30 and 31 by means of set screws 33, each rod 32 being slidable in a pair of bored angular bosses 34 and 35 located on the interior of the frame 10. The axes of the bores in the bosses 34 and the bosses 35 are substantially perpendicular to the face 17 of the gauge plate 16, and thus the sliding movement of the rods 32 in the bosses 34 and 35 moves the gauge plate frame 27, gauge plate bracket 20 and gauge plate 16 in such direction to vary the thickness of slices severed by the knife 12.

The gauge plate 16 is mounted on the hollow plate-like section 21 of the gauge plate bracket 20 by means of pins 36, which are welded to a rear face 37 of the gauge plate 16 and engaged in clips 38 secured in a pair of brackets 39, which are in turn attached to the plate-like section 21 by means of screws 40 threaded into bosses 41 on the interior of the plate-like section 21. The screws 40 pass through oversized holes 42 in the brackets 39.

After the gauge plate frame and gauge plate bracket have been assembled, a master gauge plate (not shown) (which is substantially identical to the illustrated gauge plate 16, with the exception that it has four holes through it over the location of the heads of the screws 40 and that the pins on the master gauge plate, which enter the clips 38, are of slightly smaller diameter than the pins 36 on the illustrated gauge plate 16) is placed on the plate-like supporting section 21 of the gauge plate bracket 20 in the position in which the gauge plate 16 is to be mounted. Since the heads of the screws 40 are accessible through the above-mentioned holes in the master gauge plate they can be loosened, and after adjustment of the position of the gauge plate so that its edge adjacent the exposed portion 14 of the knife 12 is concentric therewith, the screws 40 are tightened, fixing the brackets 39 in place. The master gauge plate is then removed. Thereafter when the pins 36 of the illustrated gauge plate 16, which have a slightly larger diameter than the similar pins on the master gauge plate, are inserted in the clips 38 the gauge plate is permanently and securely fixed in place with its rear face 37 against the turned-over edges of the plate-like section 21 of the gauge plate bracket and with its knife-adjacent edge permanently concentric with the cutting edge 14 of the knife 12. (Only the diameter of the knife is reduced by sharpening, its edge remaining circular at all times.)

The gauge plate frame 27 and the rods 32 are movable in the bosses 34 and 35, to adjust the position of the gauge plate face 17 relative to the plane of the cutting edge 14 of the knife 12, by the engagement of a rack 43 bolted on the forward side of the gauge plate frame 27 with a pinion 44 located on the innermost end of an indicating knob shaft 45. The shaft 45 is rotatably journaled in a bored boss 46 formed on the front wall of the base 10. The shaft 45 passes through a shouldered bore in the center of an indicating knob 47, which is located on the exterior of the front wall of the base 10 and is keyed to the shaft 45 by means of a Woodruff key 48. A coiled spring 49 surrounds the shaft 45 and is located in the hollow interior of the knob 47, being compressed between a shoulder 50 on the shaft 45 and a stop member 51 which has a tab 52 engaged in a keyway 53 in the shaft 45. The opposite surface of the stop member 51 is engaged with one surface of a disk 54, which is located on the exterior of the wall of the base 10 and has an indicator 55 formed in its upper edge which overlies the conical periphery of the indicator knob 47. The indicator knob 47 and shaft 45 are held in place in the bored boss 46 by means of a castellated nut 56 which is threaded on the innermost end of the shaft 45, acting against a washer 57 to compress the spring 49 and a resilient washer 58 located between the washer 57 and the innermost face of the boss 46. The castellated nut 56 is locked in place by a cotter pin 59, which passes through a hole in the shaft 45 and is engageable in the slots of the castellated nut 56. The tension of the spring 49 and resilient washer 58 applies sufficient friction to hold the indicator knob 47, shaft 45 and pinion 44 against any tendency to rotate that might be caused by the force of gravity acting on the gauge plate, gauge plate bracket and gauge plate frame 27, but is not enough to interfere with rotation of the knob 47 to adjust the gauge plate 16.

The stop member 51 has a keystone-shaped section 60, the opposite sides of which are engageable with a pin 61, which is forced into a bore 62 in the outer wall of the base 10 and which projects through the disk 54 (thus holding the disk 54 against rotation) to limit the movement of the gauge plate. When the keystone section 60 is engaged with the pin 61 as shown in Fig. IV, the face 17 of the gauge plate 16 lies in the plane of the cutting edge 14 of the knife 12, and the indicator 55 of the disk 54 is in registration with the zero indicium of a series of indicia 63 scribed on the conical periphery of the indicator knob 47. The opposite shoulder of the keystone-shaped section 60 of the stop member 51 establishes the maximum distance to which the gauge plate is movable and the maximum thickness of slice which can be severed from a commodity moved along the face 17 of the gauge plate past the cutting edge of the knife 12.

The embodiment of the invention that has been disclosed may be modified to meet various requirements.

Having described my invention, I claim:

1. In a slicing machine having a base and a rotatable circular knife, in combination, a gauge plate bracket supported on said base, means for adjusting said gauge plate bracket transversely to the plane of rotation of said knife, a gauge plate mounted on said bracket with its face substantially parallel to the plane of rotation of said knife, and self-engaging securing means for mounting said gauge plate on said bracket, said last named means being located entirely between adjacent sides of said gauge plate and said bracket, the exterior of said gauge plate and bracket being free from dirt-catching projections and crevasses.

2. In a slicing machine having a base and a rotatable circular knife, in combination, a gauge plate bracket supported on said base, means for adjusting said gauge plate bracket transversely to the plane of rotation of said knife, a gauge plate mounted on said bracket with its face substantially parallel to the plane of rotation of said knife, and means for mounting said gauge plate on said bracket, said last named means comprising self-engaging securing means mounted on that face of said bracket adjacent said gauge plate and on that face of said gauge plate adjacent said bracket, whereby when said gauge plate is mounted on said bracket said securing means are concealed, the exterior surfaces of said gauge plate and said bracket being free from dirt-catching projections or crevasses, said securing means being preliminarily adjustable whereby the gauge plate is properly located when applied to the bracket.

GEORGE R. WOOD.